United States Patent
Chatterton

(10) Patent No.: US 10,303,863 B2
(45) Date of Patent: May 28, 2019

(54) MOTION-BASED CREDENTIALS USING MAGNIFIED MOTION

(71) Applicant: PAYPAL, INC., San Jose, CA (US)

(72) Inventor: Geoffrey W. Chatterton, Santa Clara, CA (US)

(73) Assignee: PayPal, Inc., San Jose, CA (US)

(*) Notice: Subject to any disclaimer, the term of this patent is extended or adjusted under 35 U.S.C. 154(b) by 0 days.

(21) Appl. No.: 14/957,303

(22) Filed: Dec. 2, 2015

(65) Prior Publication Data

US 2016/0085952 A1 Mar. 24, 2016

Related U.S. Application Data

(63) Continuation of application No. 14/012,374, filed on Aug. 28, 2013, now Pat. No. 9,213,817.

(51) Int. Cl.

| | | |
|---|---|---|
| G06F 7/04 | (2006.01) | |
| G06F 12/00 | (2006.01) | |
| G06F 12/14 | (2006.01) | |
| G06F 13/00 | (2006.01) | |
| G06F 17/30 | (2006.01) | |
| G11C 7/00 | (2006.01) | |
| G06F 21/32 | (2013.01) | |
| G06F 21/31 | (2013.01) | |
| G06K 9/00 | (2006.01) | |

(52) U.S. Cl.
CPC ............ *G06F 21/32* (2013.01); *G06F 21/316* (2013.01); *G06K 9/00342* (2013.01)

(58) Field of Classification Search
CPC ........ G06F 21/32; G06F 21/36; G06F 21/316; G06F 21/30; G06F 21/31; H04L 63/0861; H04L 9/3231; G07C 9/00158; G07C 9/00071; G07C 9/00087; G07C 9/00563; G06K 9/00335; G06K 9/00342
See application file for complete search history.

(56) References Cited

U.S. PATENT DOCUMENTS

| | | | |
|---|---|---|---|
| 8,819,812 B1* | 8/2014 | Weber | G06F 3/017 |
| | | | 726/19 |
| 2010/0127827 A1* | 5/2010 | Watanabe | G06K 9/00342 |
| | | | 340/5.83 |
| 2013/0086674 A1* | 4/2013 | Horvitz | G06F 21/32 |
| | | | 726/19 |
| 2013/0135192 A1 | 5/2013 | Shibata et al. | |

(Continued)

OTHER PUBLICATIONS

Jue Wang et. al., The Cartoon Animation Filter, ACM Transactions on Graphics, vol. 25, No. 3, Jul. 2006. pp. 1169-1173.

(Continued)

*Primary Examiner* — Shewaye Gelagay
*Assistant Examiner* — Amie C. Lin
(74) *Attorney, Agent, or Firm* — Haynes and Boone LLP

(57) ABSTRACT

Systems and methods are provided which allow for motion-based authentication of a user using magnified motion. Very small or imperceptible motions of a user may be captured and magnified to determine characteristics of the motions that may be used as a motion-based credential for user authentication. The motions, which may be very small and imperceptible to an observer, may be difficult for potential attackers to observe and copy, but may be useful when magnified.

20 Claims, 10 Drawing Sheets

(56) References Cited

U.S. PATENT DOCUMENTS

| | | | | |
|---|---|---|---|---|
| 2013/0212655 | A1* | 8/2013 | Hoyos | G06K 9/00107 |
| | | | | 726/5 |
| 2013/0219480 | A1* | 8/2013 | Bud | G06F 21/32 |
| | | | | 726/7 |
| 2014/0337634 | A1 | 11/2014 | Starner et al. | |
| 2014/0337949 | A1* | 11/2014 | Hoyos | H04L 63/0861 |
| | | | | 726/7 |
| 2014/9033794 | | 11/2014 | Hoyos | |
| 2015/0020181 | A1* | 1/2015 | Iwata | G06F 21/32 |
| | | | | 726/7 |
| 2015/0097936 | A1 | 4/2015 | Simske et al. | |
| 2016/0022136 | A1* | 1/2016 | Ettenhofer | A61B 3/113 |
| | | | | 600/301 |

OTHER PUBLICATIONS

H.Y. Wu, "Eulerian Video Magnification for Revealing Subtle Changes in the World," ACM Transactions on Graphics (TOG)—SIGGRAPH 2012 Conference Proceedings, vol. 31, Issue 4, Jul. 2012, Article No. 65. pp. 36.

C. Liu et. al., "Motion Magnification," ACM Transactions on Graphics (TOG)—Proceedings of ACM SIGGRAPH 2005, vol. 24, Issue 3, Jul. 2005, pp. 519-526.

Napa Sae-Bae et. al., Biometric-Rich Gestures: A Novel Approach to Authentication on Multi-touch Devices, Session: I Am How I Touch: Authenticating Users, CHI 2012, May 5-10, 2012, Austin, Texas, pp. 977-986.

\* cited by examiner

MOTION-BASED CREDENTIALS USING MAGNIFIED MOTION

CROSS REFERENCE TO RELATED APPLICATIONS

This application is a continuation of U.S. patent application Ser. No. 14/012,374 filed on Aug. 28, 2013, the full disclosure of which is incorporated by reference herein in its entirety and for all purposes.

BACKGROUND

Technical Field

Embodiments disclosed herein are related authentication systems and methods that magnify recorded motion for use as a motion-based credential.

Related Art

Traditional authentication using credentials may include entering credentials including a username and password such as a personal identification number (PIN) at a login screen, point-of-sale (POS), automated teller machine (ATM), and the like. However, these traditional authentication techniques have weaknesses and flaws that may be easily exploited by attackers. For example, so-called "shoulder-surfers" who are observers that can view the user's actions when entering a credential can learn the user's credentials by seeing the keys being pressed, password or PIN being entered on a screen, or even movements being made. To address these flaws, authentication systems may provide a cover to shield a user's hand from observation or not display or alter the a displayed credential after entry.

Figure 1:
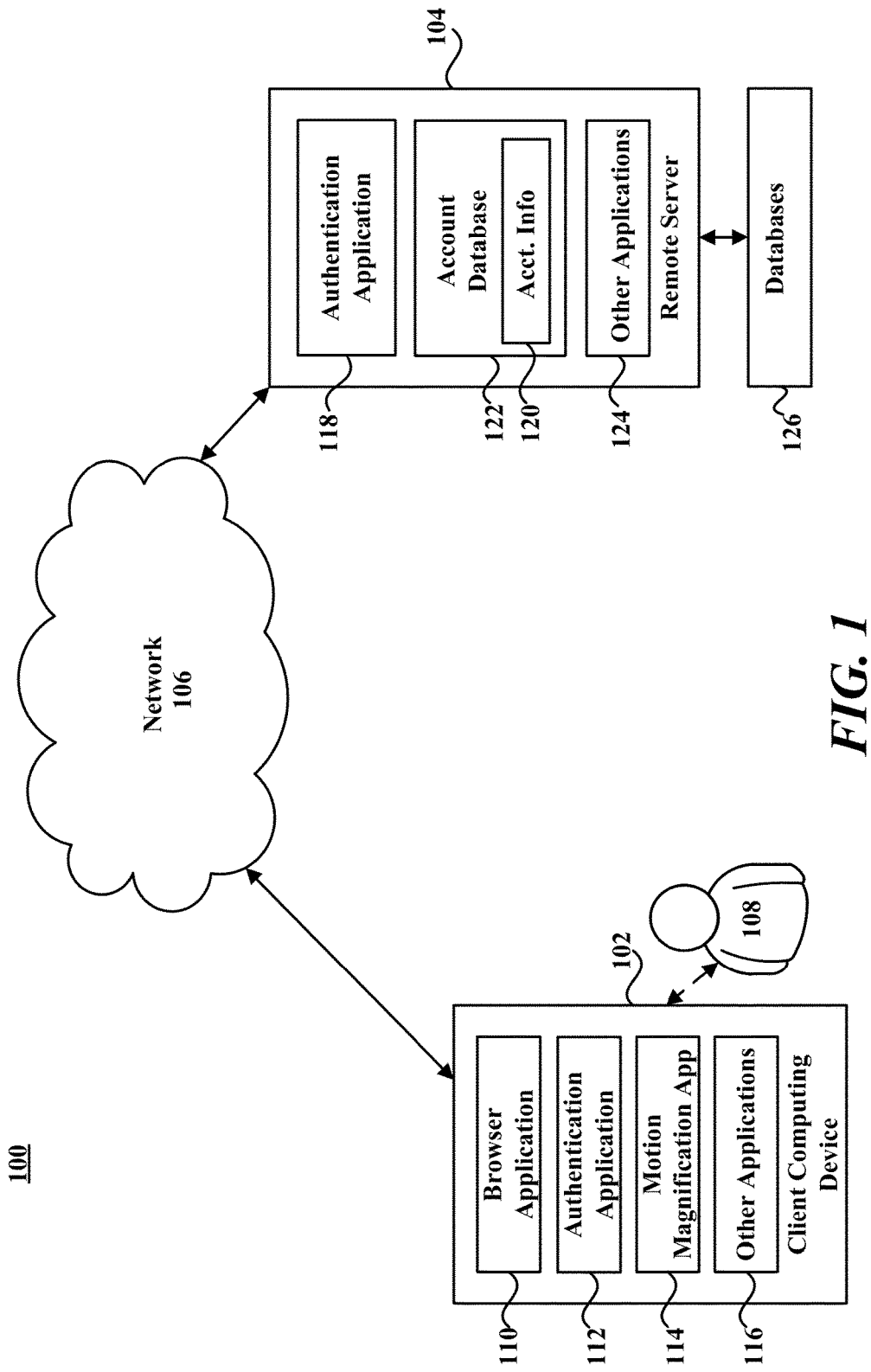
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

There is a need for motion-based authentication systems and methods that rely on movements and motions that are very small or imperceptible to a bystander so that the motion or movement is not easily observable by a bystander.

Consistent with some embodiments, there is provided a system for authenticating using a motion-based credential. The system includes an image capture device configured to capture video of motion made by a user. The system also includes a memory storing the captured video and motion characteristics associated with the user. The system further includes one or more processors configured to process the captured video to magnify the motion made by the user, analyze the magnified motion to determine motion characteristics, and encrypt authentication information when the determined motion characteristics match the stored motion characteristics, the encrypted authentication information corresponding to the motion based credential. The system also includes a network interface component configured to send the encrypted authentication information for authenticating the user.

Consistent with some embodiments there is also provided a method for authenticating a user using a motion-based credential. The method includes steps of receiving a request to authenticate, prompting the user to make a motion, capturing a video of the motion, magnifying the motion in the captured video of the motion, and analyzing the magnified motion to determine characteristics of the motion, wherein the determined characteristics of the motion correspond to the motion-based credential and are used to authenticate the user. The method may also be embodied in computer-readable media.

Consistent with some embodiments, there is further provided a method for authenticating a user using a motion-based credential. The method includes steps of receiving an authentication request, sending a prompt for authentication information, receiving motion characteristics, the motion characteristics comprising characteristics of a magnified motion of the user, and authenticating the user when the received motion characteristics match stored motion characteristics associated with the user. The method may also be embodied in computer-readable media.

Embodiments consistent with this disclosure may allow authentication using movements and motions that may normally be very small or imperceptible to an observer by magnifying the motion, determining characteristics of the magnified motion, and using the magnified motion and the determined characteristics as a motion-based credential.

FIG. 1 is a block diagram of a networked system 100, consistent with some embodiments. System 100 includes a client computing device 102 and a remote server 104 in communication over a network 106. Remote server 104 may be a payment service provider server that may be maintained by a payment service provider, such as PayPal, Inc. of San Jose, Calif. Remote server 104 may be maintained by other service providers in different embodiments. Remote server 104 may also be maintained by an entity with which sensitive credentials and information may be exchanged with client computing device 102. Remote server 104 may be more generally a web site, an online content manager, a service provider, such as a bank, or other entity who provides content to a user requiring user authentication or login.

Network 106, in one embodiment, may be implemented as a single network or a combination of multiple networks. For example, in various embodiments, network 106 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client computing device 102, in one embodiment, may be implemented using any appropriate combination of hardware and/or software configured for wired and/or wireless communication over network 106. For example, client computing device 102 may be implemented as a wireless telephone (e.g., smart phone), tablet, personal digital assistant (PDA), notebook computer, personal computer, a connected set-top box (STB) such as provided by cable or satellite content providers, or a video game system console, a head-mounted display (HMD) or other wearable computing device, including a wearable computing device having an eyeglass projection screen, and/or various other generally known types of computing devices.

Client computing device 102 may include any appropriate combination of hardware and/or software having one or more processors and capable of reading instructions stored on a tangible non-transitory machine-readable medium for execution by the one or more processors. Consistent with some embodiments, client computing device 102 includes a machine-readable medium, such as a memory (not shown) that includes instructions for execution by one or more processors (not shown) for causing client computing device 102 to perform specific tasks. In some embodiments, the instructions may be executed by the one or more processors in response to interaction by user 108. For example, such instructions may include browser application 110 such as a mobile browser application, which may be used to provide a user interface to permit user 108 to browse information available over network 106, including information hosted by remote server 104. For example, browser application 110 may be implemented as a web browser to view information available over network 106. Browser application 110 may include a graphical user interface (GUI) that is configured to allow user 108 to interface and communicate with remote server 104 or other servers managed by content providers or merchants via network 106. For example, user 108 may be able to access websites to find and purchase items, as well as access user account information or web content.

Client computing device 102 may also include an authentication application 112. In some embodiments, authentication application 112 may prompt user 108 for one or more credentials for authenticating with remote server 104 and providing the credentials to remote server 104. In some embodiments, authentication application 112 may be part of a payment application that may allow user 108 to authorize payments for goods and services (referred to collectively as "items"), with the payments being processed by remote server 106. In some embodiments, authentication application 112 may prompt user 108 for one or more motion-based credentials which may be captured by client computing device 102 and analyzed for motion characteristics that are indicative of an identity of user 108. Authentication application 112 may further include instructions for implementing a movement-based credential set-up procedure which may capture multiple initial movements of user 108 to establish a model or baseline of motion characteristics to which future authentication attempts using motion-based credentials may be matched. The established model or baseline may be stored in client computing device 102 for local matching or on remote server 104 for remote matching.

Client computing device 102 may also include a motion magnification application 114. Motion magnification application 114 may include instructions and algorithms for magnifying motion captured for authenticating using movement-based credentials. In some embodiments, motion magnification application 114 may magnify selected areas of movement to magnify small, minor, normally imperceptible movements to be larger, more visible, and having significant characteristics for analysis. Motion magnification application 114 may use Euler magnification in some embodiments and Lagrangian magnification in some embodiments. In some embodiments, motion magnification application 114 may process captured video to magnify motion of user 108 for use by authentication application 112, the magnified motion having certain observable and measurable characteristics that may be used to validate the identity of user 108 and authenticate user 108 with remote server 106. Motion magnification application 114 may also execute in conjunction with authentication application 112 and, in some embodiments, execute as a background process. Client computing device 102 may include other applications 116 as may be desired in one or more embodiments to provide additional features available to user 108, including accessing a user account with remote server 104. For example, applications 116 may include interfaces and communication protocols that allow the user to receive and transmit information through network 106 and to remote server 104 and other online sites. Applications 116 may also include security applications for implementing client-side security features, programmatic client applications for interfacing with appropriate APIs over network 106 or various other types of generally known programs and/or applications.

Remote server 104, according to some embodiments, may be maintained by an online payment provider or payment processor, such as PayPal, Inc. of San Jose, Calif., which may provide processing for online financial and information transactions on behalf of user 108. Remote server 104 may include an authentication application 118 that, in some embodiments, may be in communication with authentication application 112 and motion magnification application 114 over network 106 for authenticating user 108 to remote server 104. In some embodiments, authentication application 118 may receive one or more credentials provided by authentication application 112 of client computing device 102 for matching to credentials stored in user account information 120 in account database 122. Such credentials may include motion-based credentials captured, processed, and analyzed by authentication application 112 and motion magnification application 114 of client computing device 102. In some embodiments, authentication application 112 of client computing device 102 may capture motion-based credentials which may be magnified by motion magnification application 114, and the magnified motion data may be provided to authentication application 118 of remote server for processing and analysis to validate user 108. In some embodiments, motion magnification application 114 may be installed instead on remote server 104, such that authentication application 112 may capture raw motion-based credentials and provide the raw data to remote server 104 for motion magnification and processing. Remote server 104 may include other applications 126 and may also be in communication with one or more external databases 128, that may provide additional information that may be used by remote server 104. In some embodiments, databases 128 may be databases maintained by third parties, and may include third party account information of user 108.

Although discussion has been made of applications and applications on client computing device 102 and remote server 104, the applications may also be, in some embodiments, modules. Module, as used herein, may refer to a software module that performs a function when executed by one or more processors or Application Specific Integrated Circuit (ASIC) or other circuit having memory and at least one processor for executing instructions to perform a function, such as the functions described as being performed by the applications.

Figure 2:
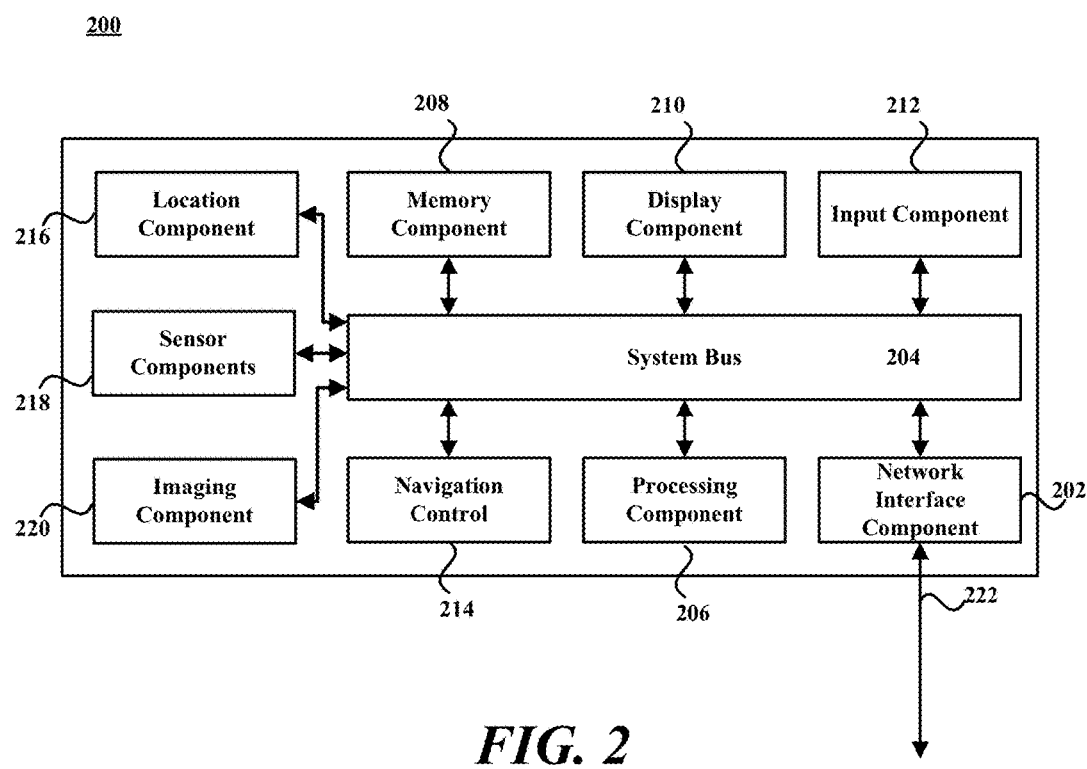
FIG. 2 is a diagram illustrating a computing system, consistent with some embodiments.

FIG. 2 is a diagram illustrating computing system 200, which may correspond to either of client computing device 102 or remote server 104, consistent with some embodiments. Computing system 200 may be a mobile device such as a smartphone, a tablet computer, a personal computer, laptop computer, netbook, or tablet computer, set-top box, video game console, head-mounted display (HMD) or other wearable computing device as would be consistent with client computing device 102. Further, computing system 200 may also be a server or one server amongst a plurality of servers, as would be consistent with remote server 104. As shown in FIG. 2, computing system 200 includes a network interface component (NIC) 202 configured for communication with a network such as network 108 shown in FIG. 1. Consistent with some embodiments, NIC 202 includes a wireless communication component, such as a wireless broadband component, a wireless satellite component, or various other types of wireless communication components including radio frequency (RF), microwave frequency (MWF), and/or infrared (IR) components configured for communication with network 106. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 106.

Consistent with some embodiments, computing system 200 includes a system bus 204 for interconnecting various components within computing system 200 and communicating information between the various components. Such components include a processing component 206, which may be one or more processors, micro-controllers, graphics processing units (GPUs) or digital signal processors (DSPs), and a memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user 120 of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as consumer 120, to input information to computing system 200. Such information could include payment information such as an amount required to complete a transaction, account information, authentication information such as a credential, or identification information. An input component 212 may include, for example, a keyboard or key pad, whether physical or virtual. Computing system 200 may further include a navigation control component 214, configured to allow a user to navigate along display component 210. Consistent with some embodiments, navigation control component 214 may be a mouse, a trackball, or other such device. Moreover, if device 200 includes a touch screen, display component 210, input component 212, and navigation control 214 may be a single integrated component, such as a capacitive sensor-based touch screen.

Computing system 200 may further include a location component 216 for determining a location of computing system 200. In some embodiments, location component 216 may correspond to a GPS transceiver that is in communication with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200. Computing system 200 may also include sensor components 218. Sensor components 218 provide sensor functionality, and may correspond to sensors built into client computing device 102 or sensor peripherals coupled to client computing device 102. Sensor components 218 may include any sensory device that captures information related to user 108 and/or client computing device 102 that may be associated with any actions that user 108 performs using client computing device 102. Sensor components 218 may include accelerometers, biometric readers, GPS devices, and other devices that are capable of providing information about client computing device 102 or user 108, or an environment therearound.

Computing system 200 may also include am imaging component 220. In some embodiments, imaging component 220 may be an optical camera capable of capturing images. In some embodiments, the captured images may be a series of captured images, such as video frames. Imaging component 220 may be used by authentication application 112 of client computing device 102 to capture motion or movement by user 108 to use as motion-based credentials.

Computing system 200 may perform specific operations by processing component 206 executing one or more sequences of instructions contained memory component 208. In other embodiments, hard-wired circuitry may be used in place of or in combination with software instructions to implement the present disclosure. Logic may be encoded in a computer readable medium, which may refer to any medium that participates in providing instructions to processing component 206 for execution, including memory component 208. Consistent with some embodiments, the computer readable medium is tangible and non-transitory. In various implementations, non-volatile media include optical or magnetic disks, volatile media includes dynamic memory, and transmission media includes coaxial cables, copper wire, and fiber optics, including wires that comprise system bus 204. According to some embodiments, transmission media may take the form of acoustic or light waves, such as those generated during radio wave and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computing system 200. In various other embodiments of the present disclosure, a plurality of computing systems 200 coupled by a communication link 222 to network 108 (e.g., such as a LAN, WLAN, PTSN, and/or various other wired or wireless networks, including telecommunications, mobile, and cellular phone networks) may perform instruction sequences to practice the present disclosure in coordination with one another. Computing system 200 may transmit and receive messages, data and one or more data packets, information and instructions, including one or more programs (i.e., application code) through communication link 222 and network interface component 202 and wireless transceiver 220. Received program code may be executed by processing component 206 as received and/or stored in memory component 208.

Figure 3:
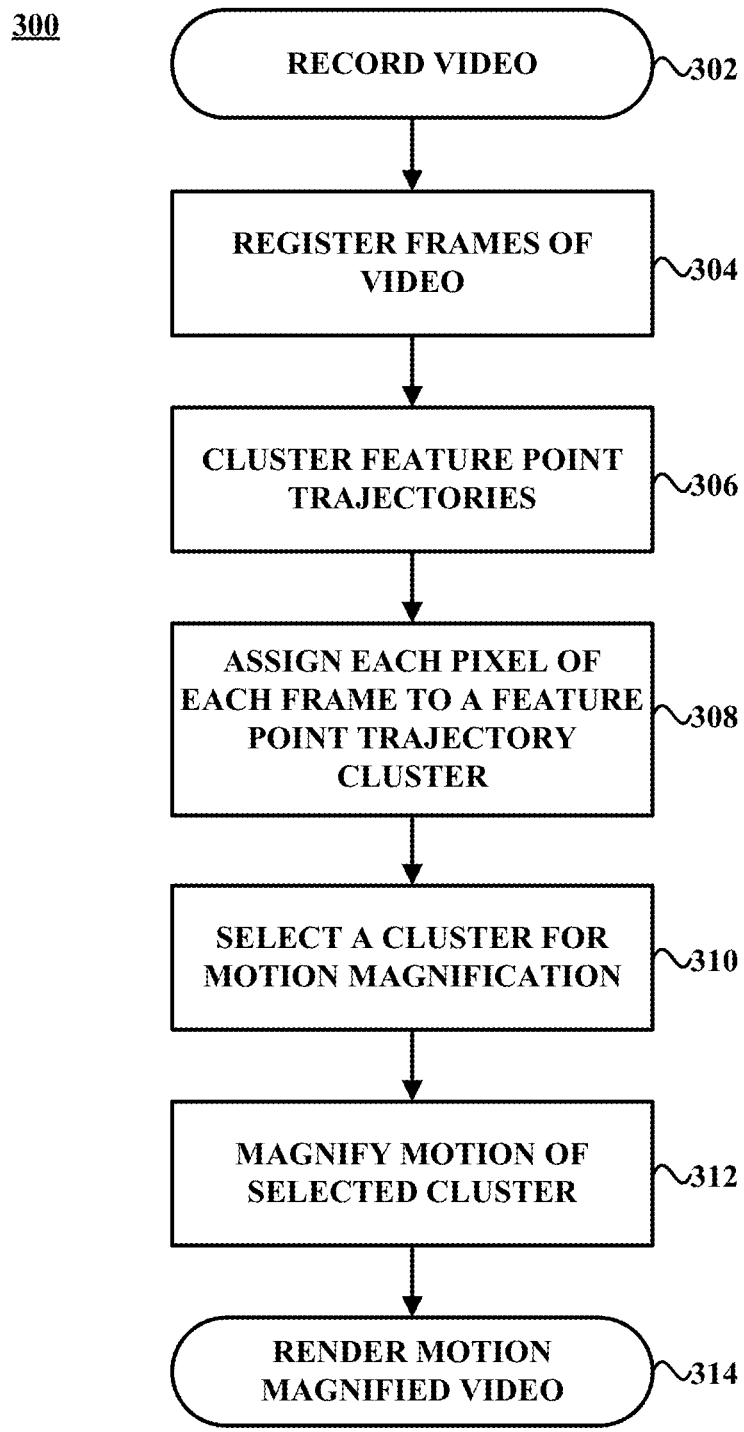
FIG. 3 is a flowchart illustrating a method for performing Lagrangian motion magnification, according to a known embodiment.

FIG. 3 is a flowchart illustrating a method for performing Lagrangian motion magnification, according to a known embodiment. As described above, motion magnification application 114 of client computing device 102 may perform Lagrangian motion magnification on captured video for magnifying selected areas of the captured video for analysis and identification of characteristics to use as motion-based credentials. Process 300 is a method for performing Lagrangian motion magnification as set forth in Liu, C., et al. "Motion Magnification," ACM Transactions on Graphics (TOG)—Proceedings of ACM SIGGRAPH 2005, Vol. 24, Issue 3, July 2005, pages 519-526. As described therein, process 300 may analyze the motions of a video sequence such that a user can select a certain segment of pixels to be magnified. When the video is processed, the selected segment of pixels will have greatly exaggerated movements. As a result, movements which may normally appear very minor or even invisible to the human eye can be magnified such that the movements are perceptible in the processed video.

As shown in FIG. 3, process 300 begins by recording a video (302) and registering frames of the video (304) by performing an initial tracking of detected feature points in the recorded video and finding an affine warp which best removes the motions of the set of tracked feature points while ignoring outliers. Feature point trajectories may then be clustered (306) by grouping very small motions with larger motions to which they are correlated. Each pixel of each frame may then be assigned to a one of the feature point trajectory clusters (308) using motion, pixel color, and position to define a Markov random field. Each pixel trajectory may then be assigned to its most commonly assigned cluster over all time frames. A user may the select a particular cluster for motion magnification (310) and the selected cluster may then have its motion magnified (312) by amplifying all translations from the reference position by a constant amplification factor. The video having motion of the selected cluster magnified may then be rendered (314). The rendered motion magnified video may then include the selected cluster having magnified motion, which may be analyzed to determine the parameters of the magnified motion which, when not magnified, may be difficult to analyze from video.

Figure 4:
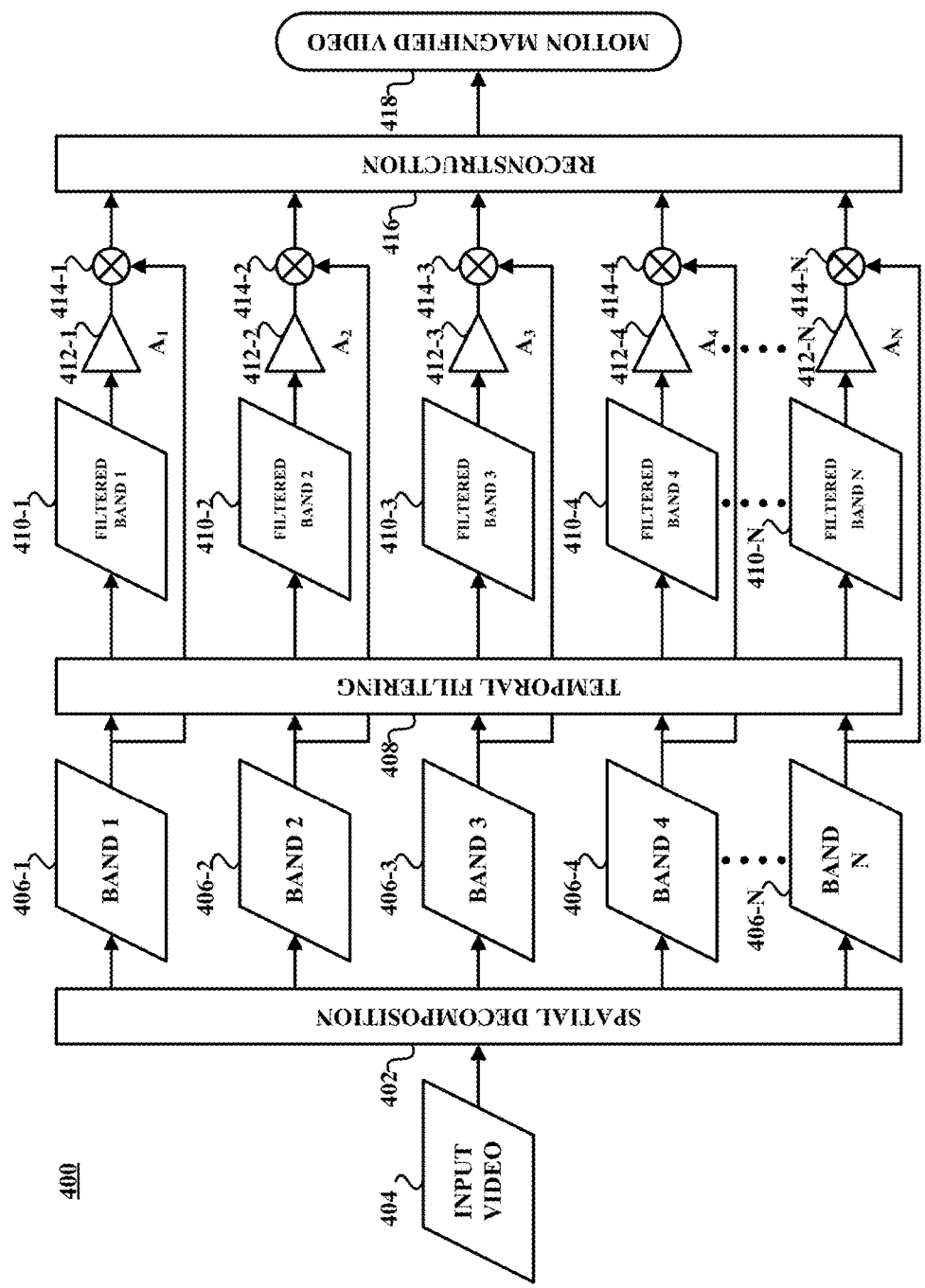
FIG. 4 is a flowchart illustrating a method for performing Eulerian motion magnification, according to a known embodiment.

FIG. 4 is a flowchart illustrating a method for performing Eulerian motion magnification, according to a known embodiment. As described above, motion magnification application 114 of client computing device 102 may perform Eulerian motion magnification on captured video for magnifying selected areas of the captured video for analysis and identification of characteristics to use as motion-based credentials. Process 400 is a method for performing Eulerian motion magnification as set forth in Wu, H. Y., et al. "Eulerian Video Magnification for Revealing Subtle Changes in the World," ACM Transactions on Graphics (TOG)—SIGGRAPH 2012 Conference Proceedings, Vol. 31, Issue 4, July 2012, Article No. 65. As described therein, process 400 may perform spatial decomposition 402 on an input video 404 to decompose input video 404 into N different spatial frequency bands 406-1-406-N. Each of the N-different spatial bands may then be temporally filtered by a temporal filter 408 to produce N-filtered bands 410-1-410-N. Each of the N-filtered bands 410-1-410-N may then be amplified by a given factor $A_N$ by amplifiers 412-1-412-N. The output of amplifiers 412-1-412-N may be combined 414-1-414-N with the unfiltered N-different spatial frequency bands 406-1-406-N. The N combined outputs may then be reconstructed 416 to output a motion magnified video 418. The combining 414-1-414-N may include summing the amplified signals with the N-different spatial frequency bands 406-1-406-N. Moreover, the choice of a temporal filter and amplification factor $A_N$ may be tuned based on the particular application of process 400. Similar to process 300, process 400 may produce a motion magnified video 418, which may be analyzed to determine the parameters of the magnified motion which, when not magnified, may be difficult to analyze from video.

Figure 5:
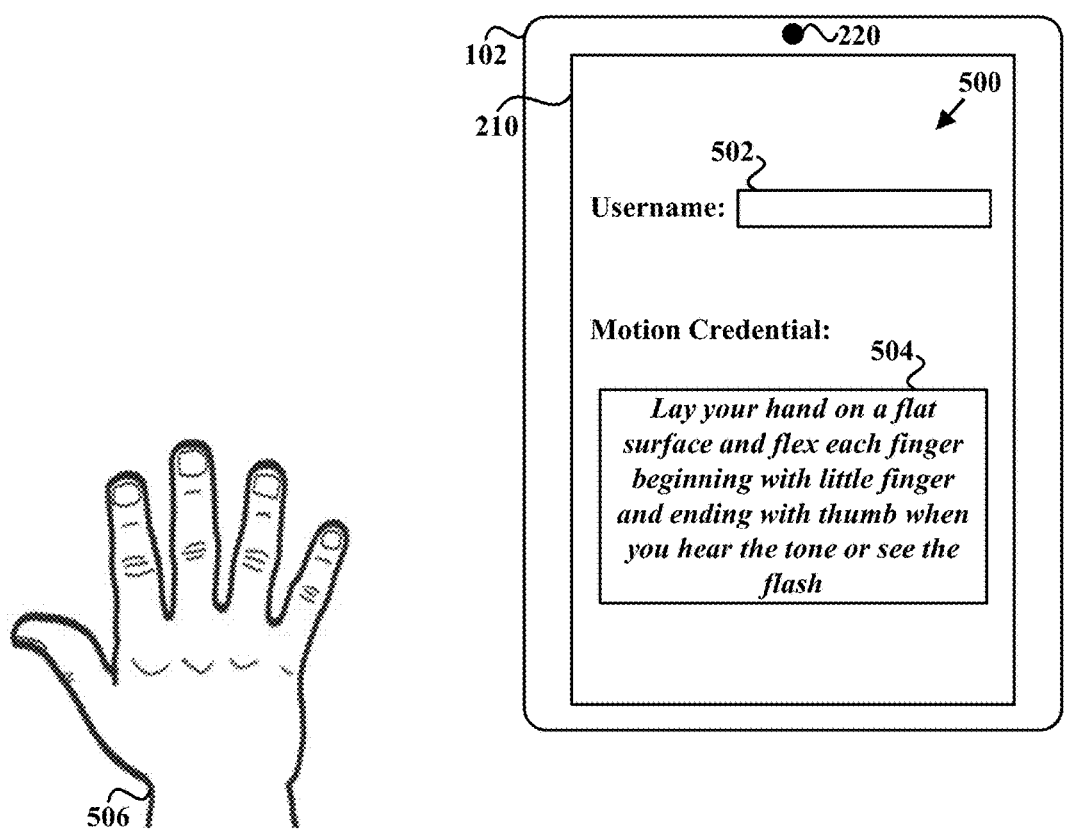
FIG. 5 is a diagram illustrating user authentication based on magnified motion, consistent with some embodiments.

FIG. 5 is a diagram illustrating user 108 authentication based on magnified motion, consistent with some embodiments. As discussed previously, authentication application 112 of client computing device 102 may prompt user 108 for one or more motion-based credentials which may be captured by client computing device 102 and analyzed for motion characteristics that are indicative of an identity of user 108. In some embodiments, the motion-based credentials may correspond to very small finger movements. For example, as shown in FIG. 5, display component 210 of client computing device 102 may display an interface 500 requesting that user 108 enter a username 502 and a motion credential 504, which may correspond to movements or motions made by flexing each finger on a hand 506 of user 108. The flexing of the finger may be captured by imaging component 220 and magnified by motion magnification application 114 such that the magnified motion of the flexing of the fingers may be analyzed to verify an identity of user 108 and used to authenticate user 108 with remote server 104. In some embodiments, motion magnification application 114 may use Lagrangian motion magnification, such as described with respect to FIG. 3, or Eulerian motion magnification, such as described with respect to FIG. 4. Moreover, although the movement of fingers is discussed as a motion-based credential in this embodiment, in other embodiments, other normally imperceptible motions may be magnified for use as a motion-based credential. Such motions may include eye movement, mouth movement, head movement, and the like.

Returning to FIG. 5, interface 500 requesting motion credential 504 may also include instructions for performing the motion that will be captured by imaging component 220. Although not shown, client computing device 102 may also include a light such as a light emitting diode (LED), or a speaker configured to emit a tone, wherein the light will blink or the speaker will emit a tone when the user is supposed to perform the motion. The flashing light may also be provided by flashing display component 210 or rendering a flashing graphic on display component 210. In some embodiments, the cue provided by the blinking light or audible tone may have a predetermined timing that may be used by motion magnification application 114 to correlate motions made by hand 506 to a timing of the captured video of hand 506. For example, user 108 may be requested to move each finger of hand 506 starting with the little finger of hand 506 and ending with the thumb of hand 506 at predetermined intervals designated by an audible tone or blinking light.

The motion made by user 108 when entering the motion-based credential may then be captured by imaging component 220, stored in memory component 208, and processed by processing component 206 according to instructions specified in motion magnification application 114 to magnify the motion of the flexing of the fingers such that the motion is magnified to be capable of being analyzed to verify an identity of user 108 and used to authenticate user 108 with remote server 104.

In some embodiments, the example of motion magnification shown in FIG. 5 may be used to register motions of hand 506 to establish a baseline so that the registered motion may be used for comparison to subsequent motions that may be used, for example, to authenticate user 102 with remote server 104. For example, when user 108 first uses authentication application 112, user 108 may be required to perform motions, such as flexing fingers on hand 506, of which video or other images may be captured and magnified for analysis. User 108 may be required to perform the motions multiple times until authentication application 112 has enough information from the magnified motions to establish a baseline from which subsequent motions can be compared. In some embodiments, authentication application 112 may establish a range of motion attributed to flexing a finger, such that a magnified motion of flexing an index finger exhibits a certain range of motion. In some embodiments, authentication application 112 may apply one or more machine-learning algorithms to the captured motions to predict what a motion of user 108 should be when magnified, based on the distance to imaging component 220, the position of hand 506, and other factors. Moreover, authentication application 112 may use a neural net to use fuzzy logic to attempt to match a magnified motion to an ideal or stored motion.

Once user 108 has successfully registered motions of hand 506, user 108 may be able to use magnified motions of hand as a credential to authenticate with remote server 104. In some embodiments, user 108 may be required to enter username 502 and then the registered motions may be captured and analyzed for use in authentication, in lieu of a password or personal identification number (PIN). In some embodiments, user 108 may not need to enter username 502, as the magnified motions may be a sufficient credential unique to user 108, similar to a biometric credential. In one example, a certain order of finger movement may correspond to a motion-based credential of user 108. For example, the order may be thumb, little finger, ring finger, index finger, thumb. Any order of finger movements may make up the motion-based credential and may be assigned by authentication application 112 or 118, or may be assigned by user 108. Although the discussion with respect to FIG. 5 has focused on magnifying the motions of a hand 506 of user 108, in some embodiments other seemingly imperceptible or small movements or motions may be used for authentication. Such movements or motions may include moving (or wriggling) of the nose, tightening facial muscles, and the like. Consequently, by magnifying small or otherwise imperceptible movements made by user 108, and magnifying these movements for the collection of real and meaningful data, user 108 may be able to authenticate with remote server 104 by making movements instead of entering passwords, PINs, and the like.

Figure 6:
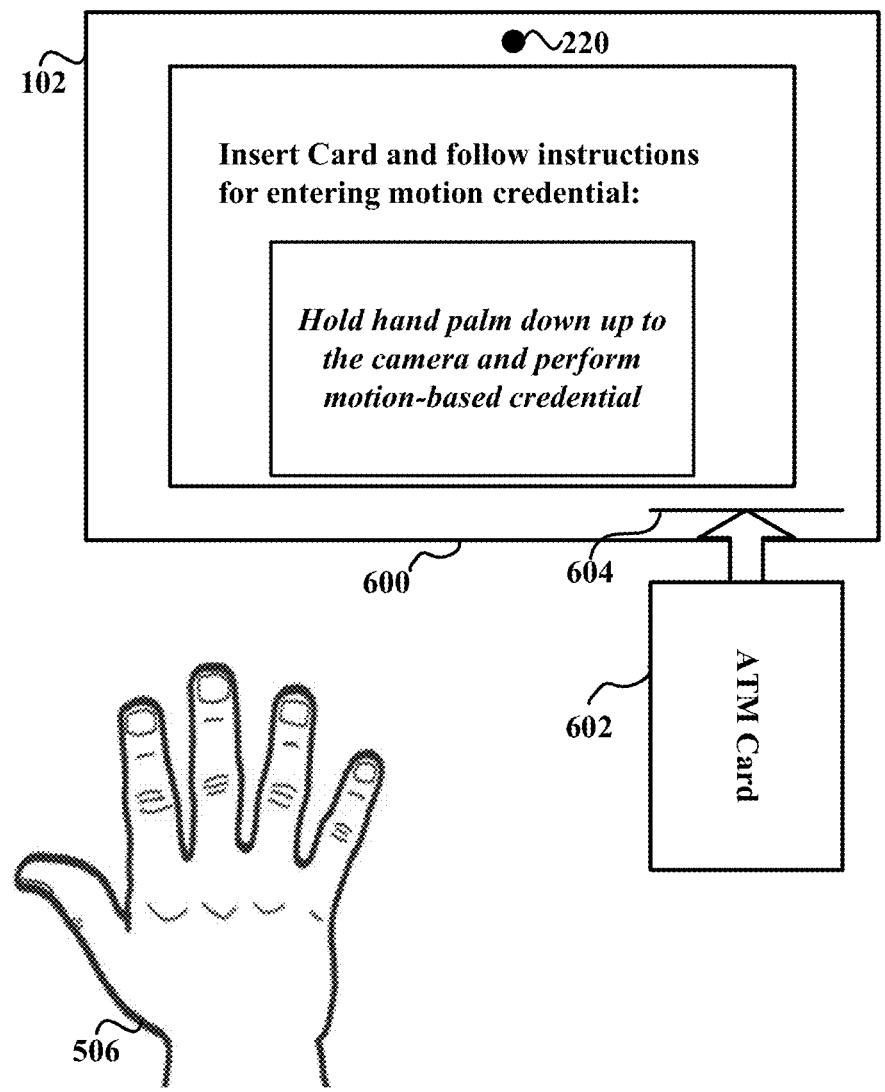
FIG. 6 is a diagram illustrating authenticating at an automatic teller machine (ATM) using a motion-based credential, consistent with some embodiments.

FIG. 6 is a diagram illustrating authenticating at an automatic teller machine (ATM) 600 using a motion-based credential, consistent with some embodiments. As shown in FIG. 6, client computing device 102 may correspond to an ATM such that user 108 may be capable of authenticating at the ATM using magnified motions. Typically, when user 108 interacts with ATM 600, user 108 is required to enter their ATM card 602 into a card slot 602 on ATM 600 and enter a PIN. However, consistent with some embodiments, user 108 may be able to use a captured motion that has been magnified to interact with ATM 600. Imaging component 220 of ATM 600 would capture images of user 108 moving fingers of hand 506 in a particular order unique to user 108, and the captured images would have the movement of the fingers magnified for analysis and comparison with a registered motion previously captured to determine if the order of finger motions match the order that is assigned to user 108. When the captured magnified motion matches the registered magnified motion, within a predetermined tolerance, user 506 may be able to interact with ATM 600 in the same way as if they had entered their PIN.

Additional examples of using motion-based credentials to authenticate may include make head movements in a particular order, such as left, right, forward, backward. These movements, if made small enough, would be normally imperceptible to observers but, when magnified by motion-magnification application, the movements may be analyzed to determine the order and direction of the movements. Another example would be clenching a jaw and even clenching a jaw in a certain direction in a certain order, or moving a nose up/left/right. In general, any motion that is normally small and imperceptible to a user may be magnified to be used as a motion-based credential.

In some embodiments, the magnified motion may be mapped to an action or command. For example, a small nearly imperceptible motion of a finger moving right to left may be magnified, and a motion vector of the movement clearly showing the right to left movement may be mapped to a swipe command. As another example, the motion of wriggling one's nose may be mapped to a page turn, such that when the motion is magnified, the motion vectors describing the motion can be clearly identified and used to indicate a page turn. Mapping the motion vectors determined from the magnified motion to actions or commands may provide additional accessibility and usability features to people having disabilities.

Figure 7:
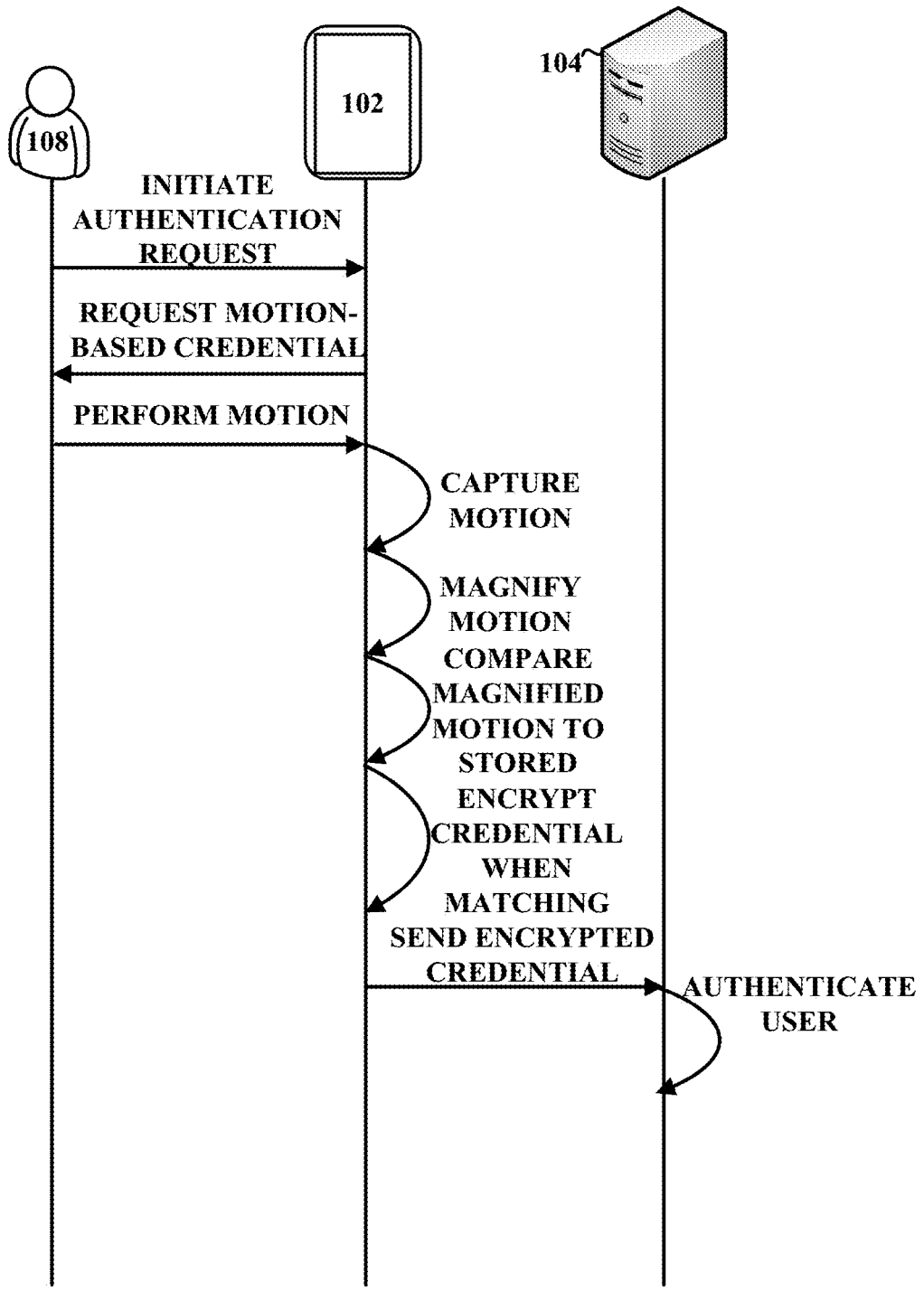
FIG. 7 is a diagram illustrating a flow of authenticating using a motion-based credential, consistent with some embodiments.

FIG. 7 is a diagram illustrating a flow of authenticating using a motion-based credential, consistent with some embodiments. As shown in FIG. 7, user 108 may initiate an authentication request using authentication application 112 on client computing device 102 for authenticating with remote server 104. Authentication application 112 may request that user 108 provide a motion-based credential. If user 108 has not previously registered a motion for use as a motion-based credential, authentication application 112 may request that user 108 perform a series of motions to establish a motion-based credential. However, if user 108 has already registered a motion for use as a motion-based credential, user 108 may perform a motion as indicated by authentication application 112. The performed motion may be captured by imaging component 220 of client computing device 102. The captured motion may then be magnified by motion magnification application 114 to highlight and exaggerate the motion, which may be a motion that is otherwise very small or imperceptible. Authentication application 112 may then compare the magnified motion to a stored registered motion. Authentication application 112 may then encrypt the credential when there is a match and send the encrypted credential to remote server 104 for authentication. In some embodiments, the encrypted credential may include an encrypted user name, account number, or other datum that may be used by remote server 104 to identify user 108. In some embodiments, the encrypted credential may also include information related to whether or not there was a match between the magnified performed motion and a stored magnified motion and a reliability indicator indicating the percent likelihood of a match. In some embodiments, if the motion-based credential includes a particular order of movements, the encrypted credential may include the order of movements.

In some embodiments, client computing device 102 may encrypt the captured motion, the magnified motion, or information related to an analysis of the magnified motion, and provide this information to remote server 104. In such embodiments, remote server 104 may magnify the motion, analyze the magnified motion, and/or determine if there is a match between the magnified performed motion and stored magnified motion. Moreover, when determining if there is a match, the determination may include analyzing the magnified motion to determine if there is a match using a known pattern matching algorithms suitable for the motion being analyzed, Such algorithms may include analyzing motion vectors of the areas of magnified motion.

Figure 8:
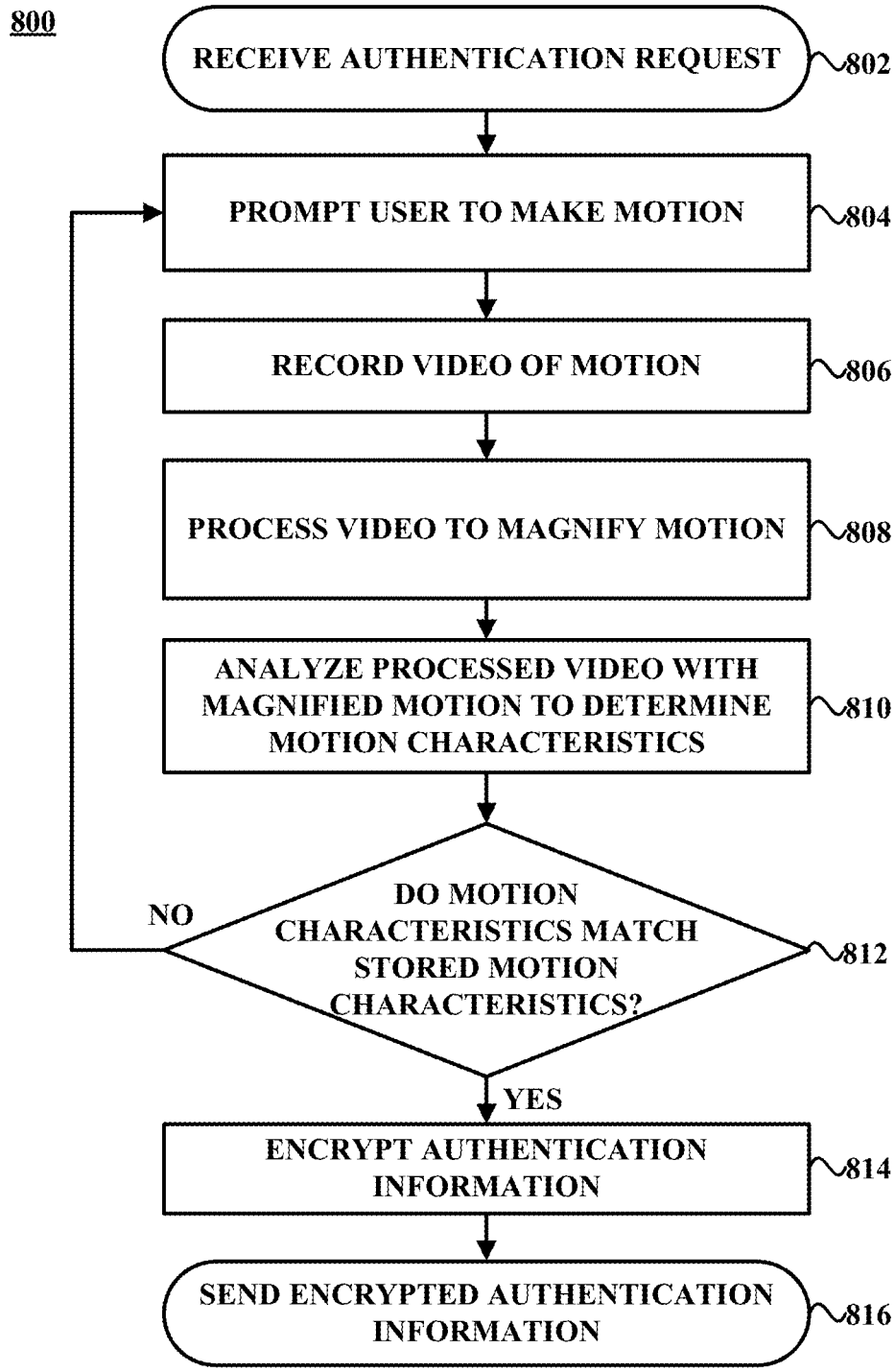
FIG. 8 is a flowchart illustrating a process for authenticating using motion-based credentials, consistent with some embodiments.

FIG. 8 is a flowchart illustrating a process 800 for authenticating using motion-based credentials, consistent with some embodiments. For the purpose of illustration, FIG. 8 may be described with reference to any of FIGS. 1-6. Process 800 shown in FIG. 8 may be embodied in computer-readable instructions for execution by one or more processors such that the steps of the method may be performed by client computing device 102. As shown in FIG. 8, process 800 may begin when client computing device 102 receives an authentication request (802). In some embodiments, client computing device 102 may receive an authentication request when user 108 initiates an authentication request by activating or otherwise causing authentication application 112 to execute. Authentication application 112 may then prompt user 108 to make a motion (804). In some embodiments, the prompt may be displayed on display component 210 of client computing device 102. Moreover, user 108 may have registered one or more motions or a specific order of motion for use as a motion-based credential and authentication application may prompt user 108 to make the same or similar motion as was previously registered. Further, prompting user 108 to make the motion may include displaying instructions for performing the motion and providing user 108 with a visual or audible cue for making the motion, such as may be provided by a flashing light or emitted tone.

Authentication application 112 may recording a video of user 108 performing the motion (806). In some embodiments, imaging component 220 of client computing device 102 may capture one or more images, which may be a series of images or frames such as a video, of user 108 performing the motion. Motion magnification application 114 may then process the recorded video to magnify the motion (808). In some embodiments, motion magnification application 114 may perform Lagrangian motion magnification or Eulerian motion magnification, or other motion magnification. Authentication application 112 may then analyze the processed video with magnified motion to determine motion characteristics (810). In some embodiments, the determined motion characteristics may include motion characteristics that may be used to verify the identity of user 108 and may include determining motion vectors of the magnified motion and the size, distance, and/or length of the determined motion vectors.

Authentication application 112 may then determine if the determined motion characteristics match stored motion characteristics (812). In some embodiments, determining if the determined motion characteristics match the stored motion characteristics may include analyzing motion vectors from the analyzed magnified motion match to those of stored motion vectors determined when user 108 registered the motion-based credential. In some embodiments, the determination may also include if a certain order of motions match a stored order of motions. In some embodiments, authentication application 112 may use a neural net to apply fuzzy logic to match the determined motion characteristics to stored motion characteristics. When the determined motion characteristics are determined to not match stored motion characteristics, user 108 may be prompted to make the motion again (804). In some embodiments, user 108 may be locked out of their account or asked to use a different form of authentication when a match is not made. When the determined motion characteristics match the stored authentication information, authentication application 112 may encrypt authentication information (814) and send the encrypted authentication information (816). In some embodiments, the encrypted authentication information may include an encrypted credential such as an encrypted user name, account number, or other datum that may be used to identify user 108. In some embodiments, the encrypted credential may also include information related to whether or not there was a match between the magnified performed motion and a stored magnified motion and a reliability indicator indicating the percent likelihood of a match. The encrypted credential may also include an indication of an order in which motions were performed, such as left, left, right, for a directional motion-based credential or ring, index, middle, thumb, thumb, for a finger motion-based credential. Moreover, in some embodiments, the encrypted information may be sent to remote server 104 for authenticating user 108 with remote server 104.

Figure 9:
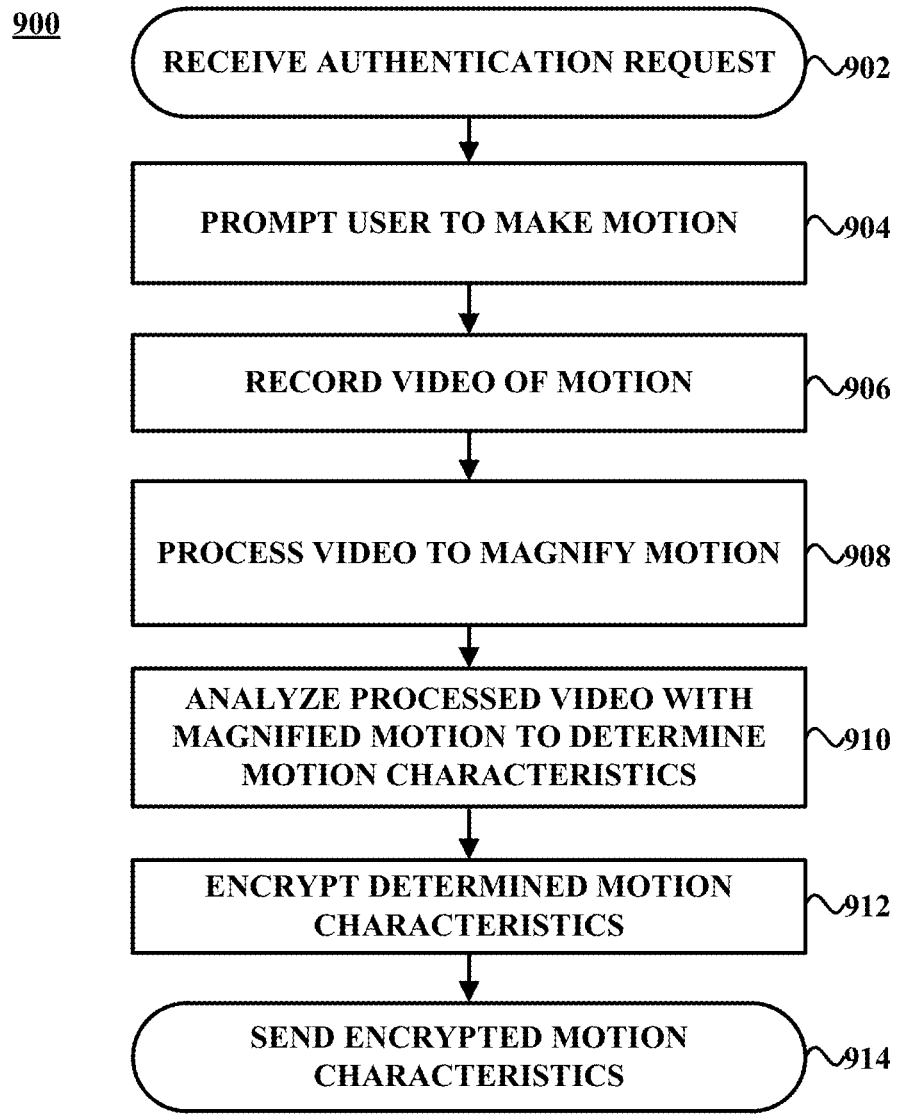
FIG. 9 is a flowchart illustrating a process for authenticating using motion-based credentials, consistent with some embodiments.

FIG. 9 is a flowchart illustrating a process 900 for authenticating using motion-based credentials, consistent with some embodiments. For the purpose of illustration, FIG. 9 may be described with reference to any of FIGS. 1-6. Process 900 shown in FIG. 9 may be embodied in computer-readable instructions for execution by one or more processors such that the steps of the method may be performed by client computing device 102. Process 900 may be similar to process 800, except in process 900 client computing device 102 determines motion characteristics, but does not determine if the motion characteristics match stored motion characteristics. Instead, client computing device encrypts the determined motion characteristics and provides them to remote server 104 which may have stored a registered motion-based credential with registered motion characteristics, and remote server 104 may perform the comparison to determine if there is a match.

As shown in FIG. 9, process 900 may begin when client computing device 102 receives an authentication request (902). In some embodiments, client computing device 102 may receive an authentication request when user 108 initiates an authentication request by activating or otherwise causing authentication application 112 to execute. Authentication application 112 may then prompt user 108 to make a motion (904). In some embodiments, the prompt may be displayed on display component 210 of client computing device 102. Moreover, user 108 may have registered one or more motions for use as a motion-based credential and authentication application may prompt user 108 to make the same or similar motion as was previously registered or a certain order of motions. Further, prompting user 108 to make the motion may include displaying instructions for performing the motion and providing user 108 with a visual or audible cue for making the motion, such as may be provided by a flashing light or emitted tone.

Authentication application 112 may record a video of user 108 performing the motion (906). In some embodiments, imaging component 220 of client computing device 102 may capture one or more images, which may be a series of images or frames such as a video, of user 108 performing the motion. Motion magnification application 114 may then process the recorded video to magnify the motion (908). In some embodiments, motion magnification application 114 may perform Lagrangian motion magnification or Eulerian motion magnification, or other motion magnification. Authentication application 112 may then analyze the processed video with magnified motion to determine motion characteristics (910). In some embodiments, the determined motion characteristics may include motion characteristics that may be used to verify the identity of user 108 and may include determining motion vectors of the magnified motion and an order of motion.

Authentication application 112 may encrypt authentication the determined motion characteristics (912) and send the encrypted authentication motion characteristics (914). In some embodiments, the encrypted motion characteristics may be sent to remote server 104 for determining if the motion characteristics match stored motion characteristics associated with user 108 and authenticating user 108 with remote server 104 if there is a match.

Figure 10:
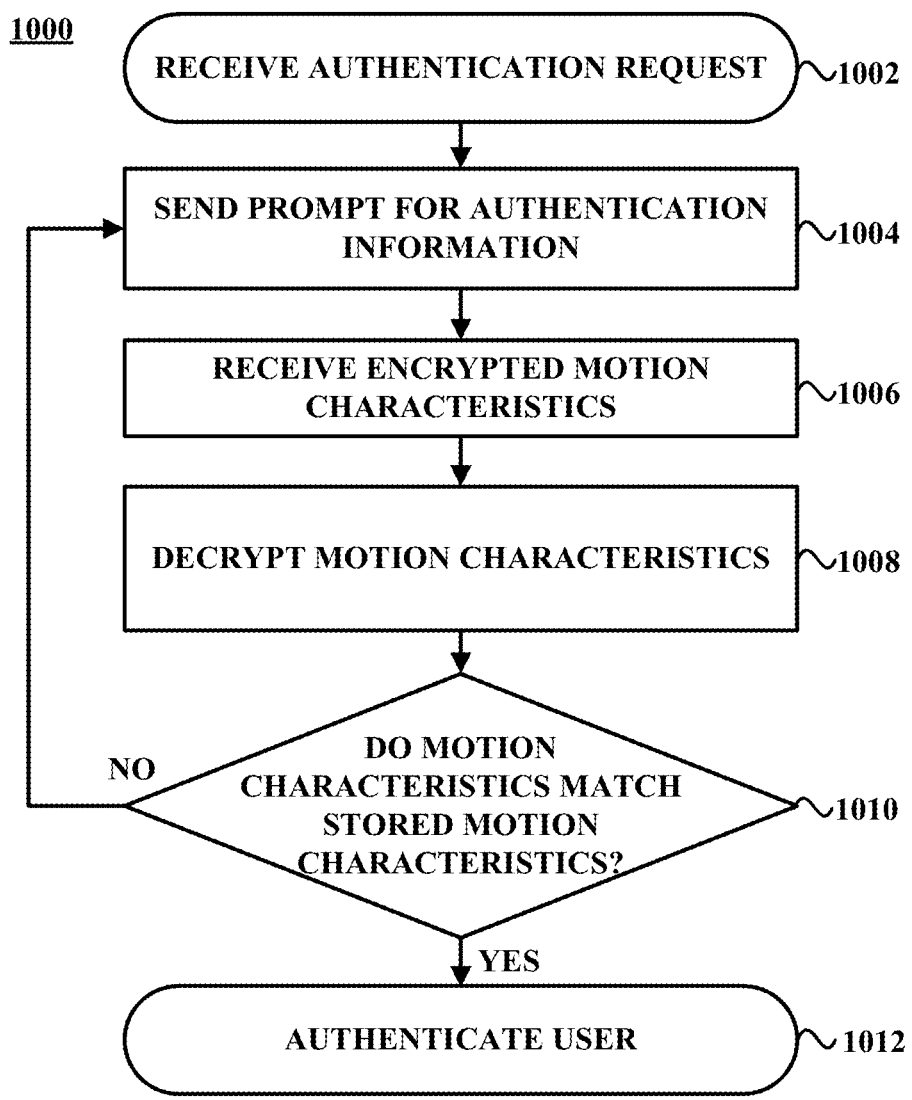
FIG. 10 is a flowchart illustrating a process for authenticating using motion-based credentials, consistent with some embodiments.

FIG. 10 is a flowchart illustrating a process 1000 for authenticating using motion-based credentials, consistent with some embodiments. For the purpose of illustration, FIG. 10 may be described with reference to any of FIGS. 1-6. Process 1000 shown in FIG. 10 may be embodied in computer-readable instructions for execution by one or more processors such that the steps of the method may be performed by remote server 104. Process 1000 may be similar to processes 800 and 900 except that remote server 104 receives an initial authentication request from client computing device 102 (1002) and then sends a prompt to client computing device 102 for authentication information (1004), the authentication information being a motion-based credential. In some embodiments, authentication application 118 of remote server 104 may cause the prompt for authentication information to be sent. Client computing device 102 may then record user 108 performing the motion, magnify the recorded motion, determine motion characteristics, and encrypt the determined motion characteristics, and send the encrypted determined motion characteristics to remote server 104.

Process 1000 continues when remote server 104 receives the encrypted motion characteristics (1006) and decrypts the received motion characteristics (1008). Authentication application 118 of remote server 104 may then determine if the received motion characteristics match motion characteristics stored in account information 120 of account database 122. In some embodiments, determining if the determined motion characteristics match the stored motion characteristics may include analyzing motion vectors from the analyzed magnified motion match to those of stored motion vectors determined when user 108 registered the motion-based credential. In some embodiments, the determination may also include if a certain order of motions match a stored order of motions. In some embodiments, authentication application 118 may use a neural net to apply fuzzy logic to attempt to match the motion characteristics to the stored motion characteristics. When the determined motion characteristics are determined to not match stored motion characteristics, authentication application 118 may send another prompt for authentication information (1004). In some embodiments, user 108 may be locked out of their account or asked to use a different form of authentication when a match is not made. When the determined motion characteristics match the stored authentication information, authentication application 118 may authenticate user 108 (1012).

Software, in accordance with the present disclosure, such as program code and/or data, may be stored on one or more machine-readable mediums, including non-transitory machine-readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein may allow authentication using movements and motions that may normally be very small or imperceptible to an observer by magnifying the motion, determining characteristics of the magnified motion, and using the magnified motion and the determined characteristics as a motion-based credential. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An authentication system, comprising:
a non-transitory memory; and
one or more hardware processors coupled to the non-transitory memory and configured to read instructions from the non-transitory memory to cause the authentication system to perform operations comprising:
receiving, from a device, an authentication request for authenticating a user;
in response to receiving the authentication request, causing the device to output a sequence of motion indication cues at predetermined time intervals, wherein each motion indication cue in the sequence of motion indication cues corresponds to an authentication movement of a body part of the user;
receiving, from an activated image capturing device of the device, images of a plurality of body parts of the user representing motions of the plurality of body parts during the outputting of the motion indication cues;
magnifying the images of the plurality of body parts;
automatically determining an order and a timing of the motions of the plurality of body parts based on the magnified images, wherein the determining the order and the timing of the motions of the plurality of body parts comprises determining that a first magnified range of motion corresponding to a flexing of a first muscle associated with a first body part was performed at a first time and a second magnified range of motion corresponding to a flexing of a second muscle associated with a second body part was performed at a second time;

determining that the order and the timing of the motions of the plurality of body parts match stored body part motion data associated with the user; and authenticating the user based at least on the determining that the order and the timing of the motions of the plurality of body parts match the stored body part motion data.

2. The authentication system of claim 1, wherein the determining the order of the motions of the plurality of body parts further comprises determining a third magnified range of motion corresponding to a flexing of a third muscle associated with a third body part in the plurality of body parts.

3. The authentication system of claim 1, wherein the magnifying the images comprises processing the images based at least on one of Lagrangian motion magnification or Eulerian motion magnification.

4. The authentication system of claim 1, wherein the determining the order of the motions of the plurality of body parts comprises determining motion vectors corresponding to at least the first and second body parts based on the magnified images.

5. The authentication system of claim 4, wherein the stored body part motion data comprises stored motion vectors corresponding to the first and second body parts, and wherein the authenticating the user comprises determining the determined motion vectors corresponding to the first and second body parts match the stored motion vectors.

6. The authentication system of claim 1, wherein the magnifying the images comprises selecting a segment of pixels to be magnified from the images.

7. The authentication system of claim 1, wherein the device comprises at least one of a client computing device or an automatic teller machine (ATM).

8. The authentication system of claim 1, wherein the stored body part motion data comprises movement order data and movement range data, and wherein the authenticating the user is further based on determining that the order of the motions of the plurality of body parts matches the movement order data and determining that the first magnified range of motion and the second magnified range of motion match the movement range data.

9. The system of claim 8, wherein the predetermined time intervals are determined based on the movement order data of the stored body part motion data.

10. The system of claim 1, wherein the sequence of motion indication cues comprises a sequence of flashing lights emitted by the device.

11. The system of claim 1, wherein the sequence of motion indication cues comprises a sequence of audio tones emitted by the device.

12. The system of claim 1, wherein the images are first images, and wherein the operations further comprise:
receiving second images of the plurality of body parts of the user prior to receiving the first images;
magnifying the second images of the plurality of body parts; and
deriving the stored body part motion data based on the magnified second images for performing a subsequent authentication of the user.

13. A non-transitory machine-readable medium having stored thereon machine-readable instructions executable to cause a machine to perform operations comprising:

receiving, from a device, an authentication request for authenticating a user;

in response to receiving the authentication request, causing the device to output a sequence of motion indication cues at predetermined time intervals, wherein each motion indication cue in the sequence of motion indication cues corresponds to an authentication movement of a body part of the user;

receiving, from an activated image capturing device of the device, images of a plurality of body parts associated with the user representing movements of the plurality of body parts during the outputting of the motion indication cues;

magnifying the images of the plurality of body parts;

determining a sequence and a timing of the movements of the plurality of body parts based on the magnified images, wherein the determining the sequence and the timing of the movements of the plurality of body parts comprises determining that a first magnified range of movement corresponding to a flexing of a first muscle associated with a first body part was performed at a first time and a second magnified range of movement corresponding to a flexing of a second muscle associated with a second body part was performed at a second time subsequent to the first time;

determining that the sequence and the timing of the movements of the plurality of body parts match stored body part movement data associated with the user; and authenticating the user based at least on the determining that the sequence and the timing of the movements of the plurality of body parts match the stored body part movement data.

14. The non-transitory machine-readable medium of claim 13, wherein the determining the sequence of the movements of the plurality of body parts further comprises determining a third magnified range of movement corresponding to a flexing of a third muscle associated with a third body parts in the plurality of body parts.

15. The non-transitory machine-readable medium of claim 13, wherein the stored body part movement data comprises movement order data and movement range data, and wherein the authenticating the user is further based on determining that the sequence of the movements of the plurality of body parts matches the movement order data and determining that the first magnified range of movement and the second magnified range of movement match the movement range data.

16. The non-transitory machine-readable medium of claim 13, wherein the determining the sequence of the movements of the plurality of body parts comprises determining motion vectors corresponding to at least the first and second body parts based on the magnified images.

17. The non-transitory machine-readable medium of claim 13, wherein the magnifying the images comprises processing the images based at least on one of Lagrangian motion magnification or Eulerian motion magnification.

18. A method, comprising:
receiving, by one or more hardware processors from a device, an authentication request for authenticating a user;

in response to receiving the authentication request, causing, by the one or more hardware processors, the device to output a sequence of motion indication cues at predetermined time intervals, wherein each motion indication cue in the sequence of motion indication cues corresponds to an authentication movement of a body part of the user;

receiving, by the one or more hardware processors from an activated image capturing device of the device, images of a plurality of body parts associated with the user representing motions of the plurality of body parts during the outputting of the motion indication cues;

magnifying, by the one or more hardware processors, the images of the plurality of body parts;

determining, by the one or more hardware processors, an order and a timing of the motions of the plurality of body parts based on the magnified images, wherein the determining the order and the timing of the motions of the plurality of body parts comprises an order of motion between a first body part and a second body part, determining that a first magnified range of motion corresponding to a flexing of a first muscle associated with the first body part was performed at a first time and a second magnified range of motion corresponding to the a flexing of a second muscle associated with the second body part was performed at a second time;

determining that the order and the timing of the motions of the plurality of body parts match stored body part motions associated with the user; and authenticating the user based at least on the determining that the order and the timing of the motions correspond to the stored body part motions associated with the user.

19. The method of claim 18, wherein the determining the order of the motions of the plurality of body parts further comprises determining a third magnified range of motion corresponding to a flexing of a third muscle associated with a third body part in the plurality of body parts.

20. The method of claim 18, wherein the sequence of motion indication cues comprises a sequence of flashing lights emitted by the device.

* * * * *

UNITED STATES PATENT AND TRADEMARK OFFICE
CERTIFICATE OF CORRECTION

PATENT NO.       : 10,303,863 B2
APPLICATION NO.  : 14/957303
DATED            : May 28, 2019
INVENTOR(S)      : Geoffrey W. Chatterton Page 1 of 1

It is certified that error appears in the above-identified patent and that said Letters Patent is hereby corrected as shown below:

In the Claims

In Column 18, Line 1 delete "the a flexing" and add "a flexing"

Signed and Sealed this
Twenty-ninth Day of October, 2019

Andrei Iancu
*Director of the United States Patent and Trademark Office*